US011957944B2

(12) United States Patent
Stevenson et al.

(10) Patent No.: US 11,957,944 B2
(45) Date of Patent: Apr. 16, 2024

(54) INCENDIARY CAPSULE

(71) Applicant: RAINDANCE SYSTEMS PTY LTD, Jandakot (AU)

(72) Inventors: Robert Andrew Stevenson, Jandakot (AU); Vincenzo Foti, Cecil Park (AU)

(73) Assignee: RAINDANCE SYSTEMS PTY LTD, Jandakot (AU)

( * ) Notice: Subject to any disclaimer, the term of this patent is extended or adjusted under 35 U.S.C. 154(b) by 933 days.

(21) Appl. No.: 15/940,209

(22) Filed: Mar. 29, 2018

(65) Prior Publication Data

US 2018/0214723 A1 Aug. 2, 2018

Related U.S. Application Data

(63) Continuation of application No. 13/376,085, filed as application No. PCT/AU2010/000694 on Jun. 4, 2010, now abandoned.

(30) Foreign Application Priority Data

Jun. 4, 2009 (AU) ................................ 2009902574

(51) Int. Cl.
*A62C 3/02* (2006.01)
*F42B 12/44* (2006.01)

(52) U.S. Cl.
CPC ............ *A62C 3/0285* (2013.01); *F42B 12/44* (2013.01)

(58) Field of Classification Search
CPC ....................................................... F42B 12/44
See application file for complete search history.

(56) References Cited

U.S. PATENT DOCUMENTS

| | | | | |
|---|---|---|---|---|
| 3,045,888 | A | 7/1962 | Forrer | |
| 3,780,655 | A | 12/1973 | Allen et al. | |
| 4,015,355 | A | 4/1977 | Schiessl et al. | |
| 4,640,724 | A * | 2/1987 | Carter | F42B 33/0207 149/109.6 |
| 4,756,250 | A * | 7/1988 | Dias dos Santos | C06C 5/00 102/202.3 |
| 6,877,433 | B1 * | 4/2005 | Stevenson | F42B 12/44 102/364 |
| 8,316,750 | B2 * | 11/2012 | Toeckes | A62C 3/0285 89/1.51 |
| 2006/0027380 | A1 | 2/2006 | Stevenson | |

FOREIGN PATENT DOCUMENTS

GB 1031284 6/1966

OTHER PUBLICATIONS

Feb. 3, 2011, International Search Report for PCT/AU2010/000694.

* cited by examiner

*Primary Examiner* — Aileen B Felton

(74) *Attorney, Agent, or Firm* — Michael Best & Friedrich LLP

(57) ABSTRACT

An incendiary capsule 10 has a body 14 forming a single compartment containing a first part 18 of a two part ignition system and a quantity of a pyrotechnic heat source (PHS) 16. The capsule 10 is initiated by injecting, when ready for use, a quantity of a second part of the two part ignition system. The ignition system generates sufficient heat to initiate the PHS 16, which burns at a substantially higher temperature than the ignition system.

20 Claims, 5 Drawing Sheets

INCENDIARY CAPSULE

CROSS REFERENCE TO RELATED APPLICATIONS

This application is a continuation of U.S. application Ser. No. 13/376,085, filed Feb. 22, 2012, which is a U.S. national stage entry of PCT/AU2010/000694, filed Jun. 4, 2010, which claims priority to AU 2009902574, filed Jun. 4, 2009. U.S. application Ser. No. 13/376,085, PCT/AU2010/000694, and AU 2009902574 are all incorporated by reference, in their entirety.

FIELD OF THE INVENTION

The present invention relates to an incendiary capsule particularly, although not exclusively, for use in airborne fire control and forestry management procedures such as back burning.

BACKGROUND OF THE INVENTION

It is known to drop incendiaries from air craft such as helicopters and light fixed wing aircraft for the purposes of forestry management and back burning. One known incendiary is in the form of a small sphere of approximately 32 mm diameter of a plastics material filled with a quantity of potassium permanganate granules or powder. The sphere is injection moulded from extruded plastic. A small hole is formed in the sphere to allow it to be filled with potassium permanganate. The hole is then sealed with wax or glue. The spheres are placed in a hopper which feeds the sphere sequentially to a chute where they are injected with a small volume of glycol. The potassium permanganate and glycol react exothermically generating a flame.

The inventor developed an alternate form of incendiary described in U.S. Pat. No. 6,877,433 in which the incendiary comprises a plurality of containers containing a volume of potassium permanganate which is subsequently injected with a volume of glycol. The containers are coupled together to form a belt which is fed through a dispensing machine that sequentially injects the capsules with glycol and separates capsules from the belt for subsequent dispensing.

SUMMARY OF THE INVENTION

A first aspect of the invention may provide an incendiary capsule comprising:

- a capsule body;
- a quantity of a pyrotechnic heat source (PHS) disposed in the capsule body; and,
- a quantity of a first part of a two part ignition system disposed in the capsule body, the first part being reactive with a second part of the ignition system which when contacted by the first part in the capsule body causes an exothermic reaction which generates sufficient heat to ignite the PHS.

The PHS may comprise a liquid impervious coating or covering.

The liquid impervious coating or covering may comprise a liquid which dries or sets on the PHS to form liquid impervious layer on the PHS.

The liquid impervious covering or coating may comprise an adhesive tape comprising a layer of adhesive for adhering onto the PHS, the layer of adhesive provided on a liquid impervious backing strip.

The liquid impervious coating or covering may comprise a coating of a plastics film.

The liquid impervious coating or covering may comprise a container made of a material that ignites at or below the temperature generated by the exothermic reaction.

The PHS may be provided in the form of a pellet.

The capsule body may comprise has an opening through which the PHS and first part of the ignition system are deposited into the capsule, and a seal that extends across and seals the opening.

The capsule body may be made of a plastics material and be provided with a flat bottom wall and a frusto-conical side wall wherein the side wall reduces in diameter from the opening to the bottom wall.

The capsule body may be provided with a lip extending about the opening and lying on a plane substantially parallel to a plane containing the bottom wall.

The seal may comprise a layer of plastics material.

The seal may comprise a layer of transparent or translucent plastics material.

The PHS may comprise thermite or may be based on a thermite like composition.

In one embodiment the PHS comprises by weight:

40-50% barium nitrate
15-20% potassium nitrate
10-15% sulphur
15-20% aluminium
1-5% gum arabic When the PHS is in the form of a pellet the liquid impervious coating may be a water proof coating and may comprise a solvent or a solvent mixture. For example in one embodiment the water proof coating comprises a mixture of shalack and methylated spirits. The PHS pellet can be dipped in a bath of such a mixture and subsequently removed to allow drying of the mixture on the pellet thereby forming the coating on the pellet. In this example the mixture may comprise between ten to thirty parts methylated spirits to one part shalack.

In another example the mixture comprises about twenty parts methylated spirits to one part shalack.

A second aspect of the invention may provide a belt of incendiary capsules comprising:

- a plurality of capsules according to the first aspect; and,
- respective couplings between adjacent capsules, the couplings joining the capsule bodies in a side by side arrangement to form a belt.

The couplings may be formed integrally with the capsule bodies.

The couplings may be made of the same material as the capsule bodies.

The couplings may be formed with the same thickness as the side walls of the capsule bodies.

The first part of the ignition system may comprise potassium permanganate.

The second part of the ignition system may comprise glycol.

A third aspect of the invention may provide an incendiary system comprising:

- one or more incendiary capsules according to the first aspect or a belt of incendiary capsules according to the second aspect; and,
- a dispensing apparatus comprising a volume of the second part of the ignition system and a mechanism for injecting a quantity of the second part of the ignition system into each incendiary capsule.

The apparatus may inject the volume of the second part of the ignition system through the seal of each incendiary capsule.

A fourth aspect of the invention may provide a method of producing a burning heat source on the ground comprising:

providing one or more capsules according to the first aspect;

carrying the one or more capsules on an aircraft;

holding a supply of a second part of the two part ignition system on the aircraft;

flying the aircraft over the ground;

while flying the aircraft depositing a quantity of the second part of the ignition system into one or more selected capsules; and, dropping the or each selected capsules with the second part of the ignition system from the aircraft.

In one embodiment the aircraft is flown at height and the first and second parts of the ignition system are provided in respective quantities wherein the or each dropped capsule reaches the group prior to ignition of the PHS.

Also disclosed herein is an incendiary capsule consisting of:

a capsule body defining and enclosing a single compartment, the capsule body having a side wall closed at opposite ends by respective outer end walls, each end wall having a surface exterior to the compartment;

a quantity of a pyrotechnic heat source (PHS) disposed in the single compartment; and, a quantity of a first part only of a two part ignition system disposed in the single compartment, the first part being reactive with a liquid second part of the ignition system which when introduced into the capsule body and contacted by the first part in the capsule body causes an exothermic reaction which generates sufficient heat to ignite the PHS.

Also disclosed herein is an incendiary system comprising at least one incendiary capsule and a dispenser, each of the at least one incendiary capsule comprising:

a closed capsule body;

a quantity of a pyrotechnic heat source (PHS) disposed in the capsule body; and, a quantity of a first part only of a two part ignition system disposed in the capsule body, the first part being reactive with a second part of the ignition system which when introduced into the capsule body and contacted by the first part in the capsule body causes an exothermic reaction which generates sufficient heat to ignite the PHS, wherein the capsule body consists of a single sealed compartment containing the first part of the two part ignition system and the PHS; wherein the dispenser is capable of injecting a quantity of the second part into the capsule, wherein the second part contacts the first part only when injected into the capsule by the dispenser.

Also disclosed herein is an incendiary capsule comprising:

a capsule body;

a quantity of a pyrotechnic heat source (PHS) disposed in capsule body;

a quantity of a first part only of a two part ignition system disposed in the capsule body, the first part being reactive with a liquid second part of the ignition system which when introduced into the capsule body and contacted by the first part in the capsule body causes an exothermic reaction which generates sufficient heat to ignite the PHS; wherein the first part is provided in a quantity such that when the single compartment is injected with the second part and dropped from an aircraft the capsule reaches the ground prior to the ignition system generating sufficient heat to ignite the PHS.

Also disclosed herein is a flexible belt of incendiary capsules comprising:

a plurality of series connected capsules;

wherein each capsule comprises a capsule body;

a quantity of a pyrotechnic heat source (PHS) disposed in the capsule body;

a quantity of a first part only of a two part ignition system disposed in the capsule body, the first part being reactive with a liquid second part of the ignition system which when introduced into the capsule body and contacted by the first part in the capsule body causes an exothermic reaction which generates sufficient heat to ignite the PHS.

Also disclosed herein is a method of airborne forestry management comprising:

flying an aircraft over a forest;

feeding at least one incendiary capsule into an incendiary dispensing machine on or in the aircraft wherein each incendiary capsule comprises:

a capsule body;

a quantity of a pyrotechnic heat source (PHS) disposed in the capsule body;

a quantity of a first part only of a two part ignition system disposed in the capsule body, the first part being reactive with a liquid second part of the ignition system which when introduced into the capsule body and contacted by the first part in the capsule body causes an exothermic reaction which generates sufficient heat to ignite the PHS;

operating the dispensing machine to inject the liquid second part of the ignition system into the capsule body to contact the first part; and dispensing the injected capsule from the aircraft.

The injected capsules may be dropped from a height and contain quantities of the first and second parts of the ignition system such that the injected capsule will reach the ground prior to the ignition system generating sufficient heat to ignite the PHS so that the PHS ignites and burns when the injected capsule reaches the ground.

BRIEF DESCRIPTION OF THE DRAWINGS

Embodiments of the present invention will now be described by way of example only with reference to the accompanying drawings in which.

DETAILED DESCRIPTION OF PREFERRED EMBODIMENTS

Figure 1A:
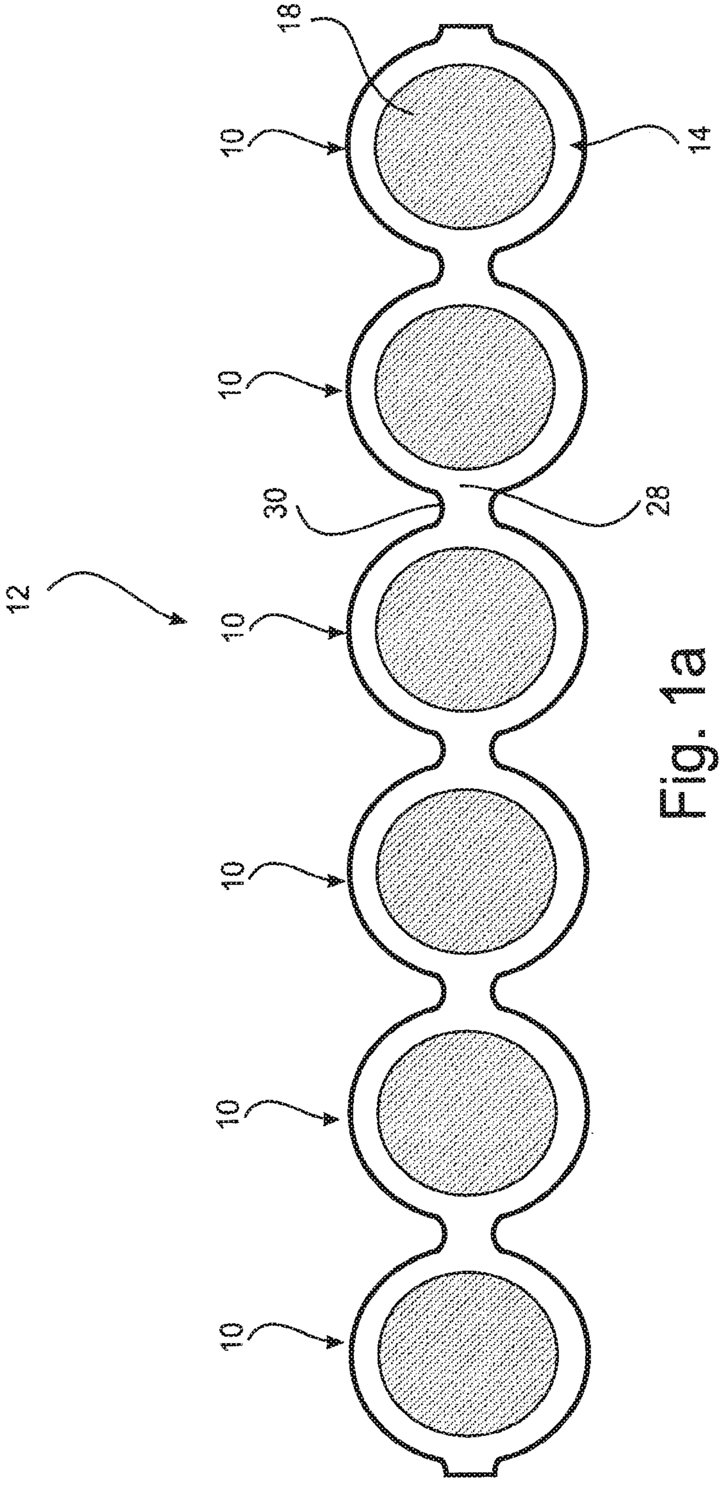
FIG. 1A is a top view of a belt of the incendiary capsules in accordance with an embodiment of the present invention.
Figure 1B:
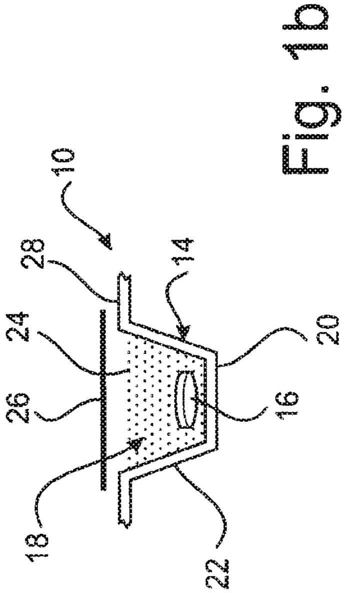
FIG. 1B is a section view of an incendiary capsule shown in FIG. 1A.

FIGS. 1A and 1B illustrate an embodiment of an incendiary capsule 10 in accordance with the present invention.

FIG. 1A illustrates a plurality of incendiary capsules 10 joined together in the side by side arrangement to form a flexible incendiary capsule belt 12. FIG. 1B depicts a section view through an incendiary capsule 10. Each incendiary capsule 10 comprises a capsule body 14 which contains a quantity of PHS 16 and a first part 18 of a two part ignition system. The second part of the ignition system (not shown) is injected into a capsule 10 when the capsule 10 is ready for use, and reacts with the first part 18 to cause an exothermic reaction which generates sufficient heat to ignite the PHS 16.

In the present embodiment, the first part 18 of the ignition system comprises potassium permanganate granules. PHS 16 is provided in the form of a pellet although it is not essential that the PHS be provided in this form. For example the PHS may also be provided in the form of granules or powder.

The PHS may comprise thermite or a thermite like compound or is otherwise based on thermite or a thermite like compound.

In general terms, thermite comprises a composition of a metal powder and metal oxide which deflagrates at extremely high temperatures typically in the order of 2,500-3,500° C. The metal powder in the thermite may comprise one or more of aluminium, magnesium, calcium, titanium, zinc, silicon, or boron. The metal oxide may comprise one or more of boron (III) oxide, silicon (IV) oxide, chromium (III) oxide, magnesium (IV) oxide, iron (III) oxide, iron (II, III) oxide, copper (II) oxide, and lead (II, IV) oxide.

In one example the PHS comprises a compound, by weight of:

40-50% barium nitrate
15-20% potassium nitrate
10-15% sulphur
15-20% aluminium
1-5% gum arabic The PHS is pressed to form pellets, with the gum arabic acting as a binder.

Figure 2:
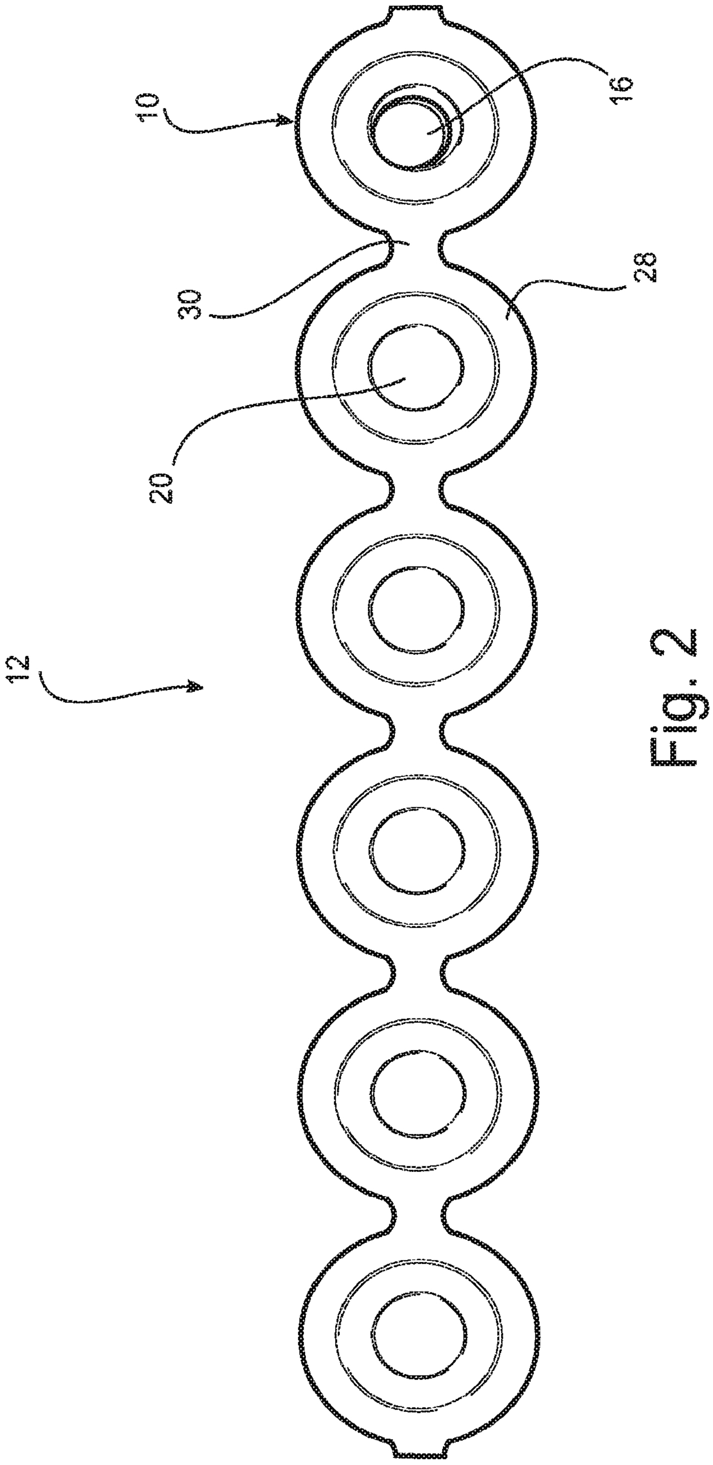
FIG. 2 is a top view of the incendiary capsule belt shown in FIG. 1A showing empty incendiary capsules, except for the right most capsule in which is disposed a quantity of PHS in the form of a pellet.
Figure 3:
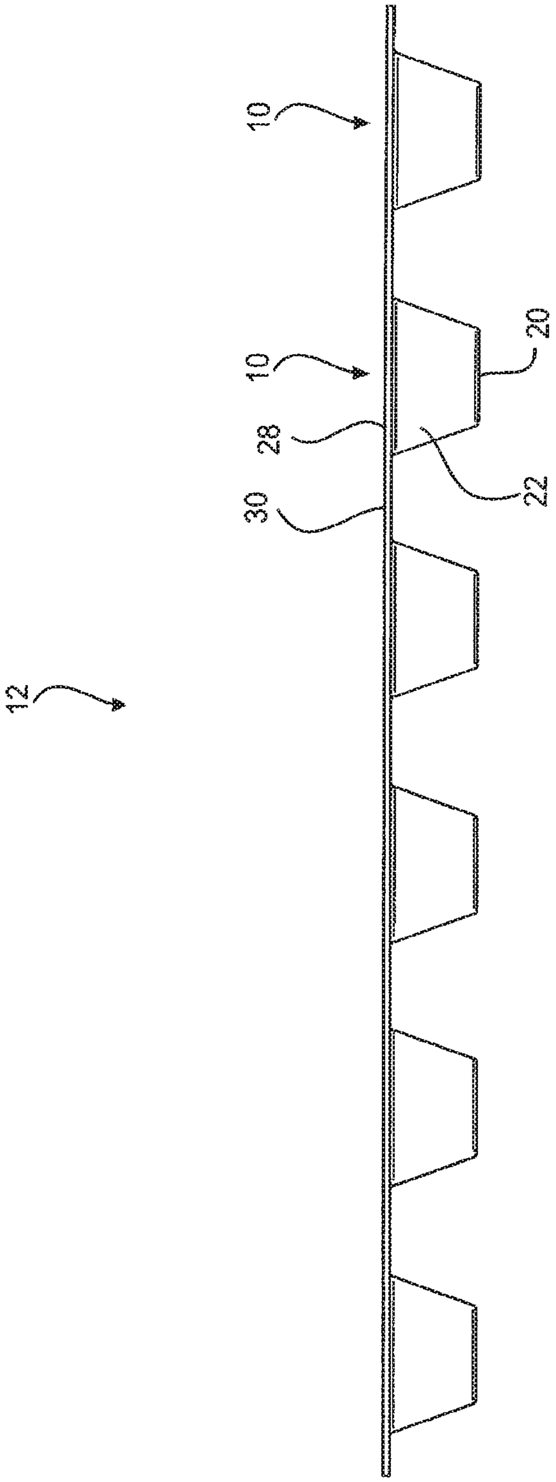
FIG. 3 is a side view of the incendiary capsule belt shown in FIG. 1A.
Figure 4:
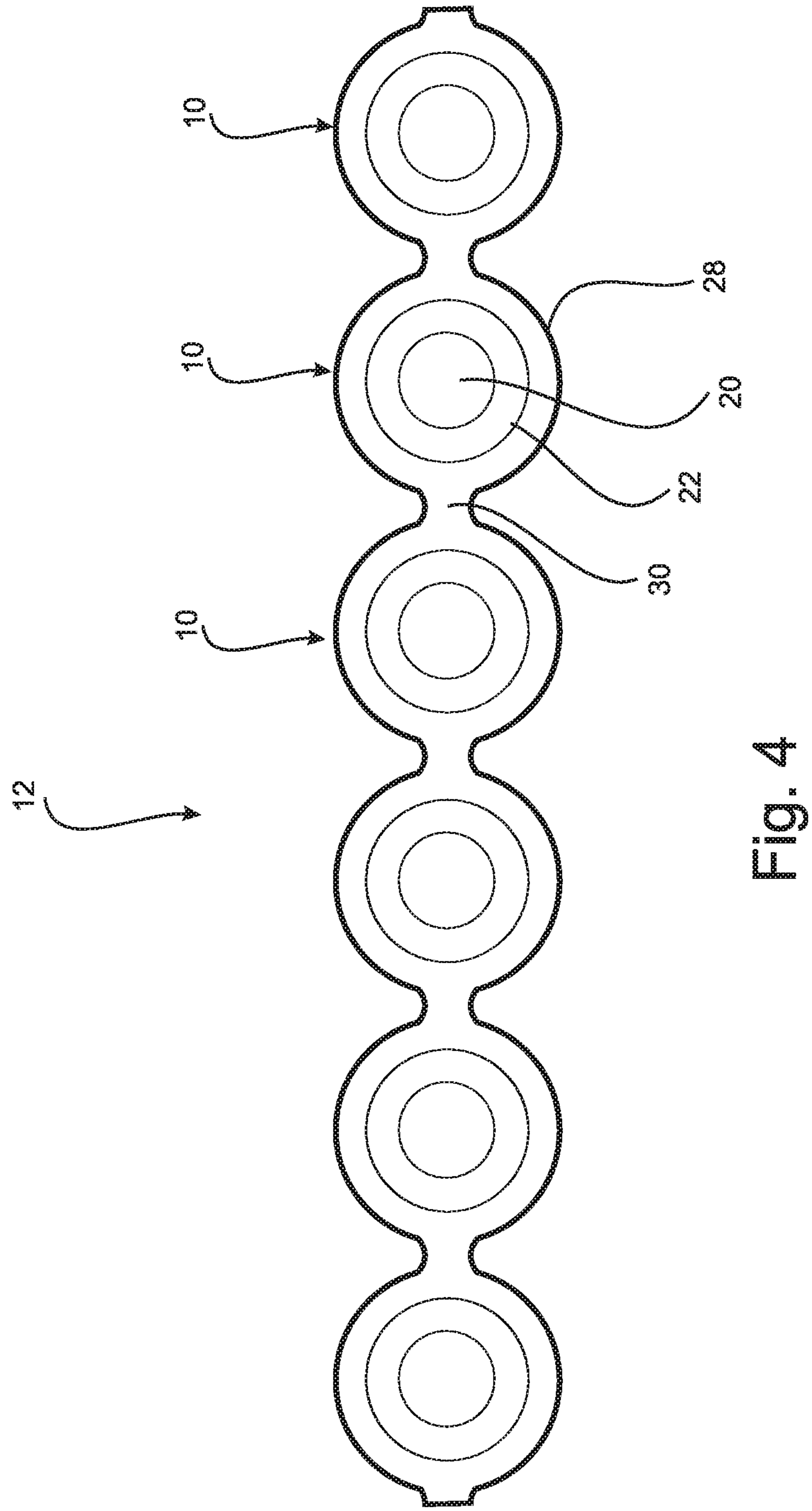
FIG. 4 is a bottom view of the incendiary capsule belt shown in FIG. 1A.
Figure 5:
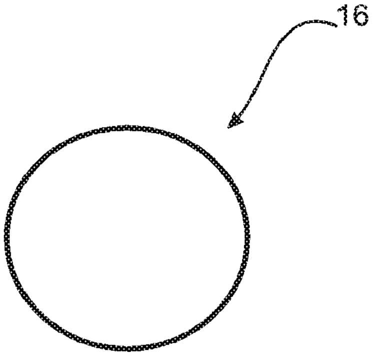
FIG. 5 is a plan view of the PHS pellet shown in FIG. 2.
Figure 6:
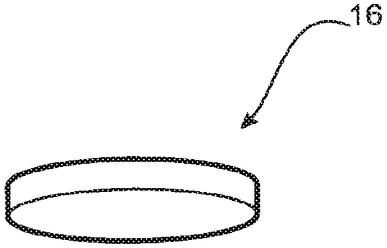
FIG. 6 is a side view of the PHS pellet shown in FIG. 5.

FIG. 2 illustrates the belt 12 of empty incendiary capsules 10 save for the right most capsule 10 in which is disposed a PHS pellet 16. The PHS pellet 16 occupies a relatively small volume of the capsule body 14 which is, for example less than 25% of the volume. FIGS. 5 and 6 depict a PHS pellet 16. The pellet has a diameter of approximately 11 mm and a thickness which reduces from a maximum of about 4 mm along a central axis to about 2 mm at its edge.

The PHS 16 is covered or coated with a liquid impervious and more specifically water proof material. The type of liquid impervious material used and its form may vary. When the PHS 16 is in the form of a pellet, the liquid impervious material may be provided initially as a liquid which is sprayed on the pellet or into which the PHS pellet is dipped, where the liquid subsequently dries or sets to create a liquid impervious layer or coating on the PHS pellet 16. In an alternate form, the liquid impervious material may be applied as adhesive tape which sandwiches the pellet 16. The adhesive tape comprising a layer of adhesive material, that contacts the pellet 16, provided on a liquid impervious backing strip. Indeed, when the PHS is in the form of a powder or granules, the powder or granules may be wrapped in an adhesive tape. In an alternate form, the covering or coating may be in the form of a thin film of plastics material such as cling wrap used for wrapping of sandwiches and other foodstuffs. This type of covering or coating is suitable for the PHS in pellet, and powder or granule form. In a further alternate, the liquid impervious material may be provided as a smaller capsule or container in which the PHS 16, in pellet or powder or granule form is contained, the container being made of material that ignites at a temperature at or below the temperature generated by the exothermic reaction between the first and second parts of the ignition system. Such containers or small capsules may be in the form for example of capsules used for medicines.

In one example a water proof coating is provided by dipping pellets 16 into a liquid bath of a solvent or solvent mixture and subsequently removed to allow drying of the liquid leaving a water proof coating on the pellet. A solvent mixture of shalack and methylated spirits has been found effective in forming the water proof coating. The mixture is of ten to thirty parts methylated spirits to one part shalack, with a mixture ratio of twenty (20) parts methylated spirits to one part shalack being particularly effective.

Present ignition system comprises potassium permanganate 18, and glycol which, when mixed cause an exothermic reaction generating heat sufficient to ignite the thermite. However alternate two part chemical ignition systems may be used provided they generate sufficient heat to ignite the PHS. It is believed that the heat required for this is at least 600-700° C.

The capsule bodies 14 comprise a substantially planar bottom wall 20 and a frusto-conical side wall 22. The side wall 22 decreases in diameter in a direction from an opening 24 of the capsule body 14 toward the bottom wall 20.

Once the PHS 16 and first part 18 of the ignition system have been deposited into the capsule body 14 through the opening 24, a seal 26 is placed across and sealed over the opening 24. The seal 26 is typically in the form of a thin film of plastics material. The material may be clear or translucent. Thus each capsule 10 comprises a single sealed compartment containing one part of the two part ignition system and a PHS 16. The second part of the two part ignition system is complete separate from the capsule 10 and remains remote from the capsule 10 until it is desired to initiate a capsule.

A circumferential lip 28 is formed about the opening 24 of the capsule 10 and lies in a plane substantially parallel to a plane containing the bottom wall 20. The seal 26 is adhered or otherwise attached to the lip 28.

In order to form the flexible belt 12, adjacent capsules 10 are joined by coupling 30. The couplings 30 extend in a plane containing a lip 28. The couplings 30 are formed integrally with and of the same material as the capsule body 14 and have the same thickness as the side wall 22 and the lip 28.

In use, the incendiaries 10 may be provided in the form of flexible belts 12 wound into reels which may then be fed into a dispener to form an overall incendiary system. The incendiary system feeds the capsules sequentially to the dispenser which injects a quantity of the second part of the ignition system (e.g. glycol) held in a storage vessel or tank into each capsule 10 through the seal 26 and severs or breaks the coupling 30 to enable separate dispensing of the incendiaries 10. During this process a needle may be used to inject the glycol into the capsules 10, where the need is controlled to penetrate into the capsule to a depth that does not reach the PHS 16. The first and second parts of the ignition system chemically react to generate heat sufficient to subsequently cause ignition of the PHS 16. When dispensing the incendiaries 10 from an aircraft, the capsules are dispensed from a height and contain quantities of the first and second parts of the ignition system such that the capsules will reach the ground prior to the ignition system generating sufficient heat to ignite the PHS 16 so that the PHS 16 ignites and burns or combusts when the capsule 10 reaches the ground.

Modifications and variations to the described embodiments of the present invention that would be obvious to a person of ordinary skill in the art are deemed to be within the scope of the present invention the nature of which is to be determined from the above description and the appended claims.

The invention claimed is:

1. An incendiary capsule consisting of:

a capsule body defining and enclosing a single compartment, the capsule body having a side wall closed at opposite ends by respective outer end walls, each end wall having a surface exterior to the compartment;

a quantity of a pyrotechnic heat source (PHS) in the form of powder or granules disposed in the single compartment; and, a quantity of a first part only of a two part ignition system disposed in the single compartment with the PHS so as to contact the PHS, the first part being reactive with a liquid second part of the ignition system which when introduced into the capsule body and contacted by the first part in the capsule body causes an exothermic reaction which generates sufficient heat to ignite the PHS, wherein an injector is used to inject the liquid second part into the capsule body.

2. The incendiary capsule according to claim 1 wherein the PHS powder or granules comprises a liquid impervious coating.

3. The incendiary capsule according to claim 2 wherein the liquid impervious coating is made of a material that ignites at or below the temperature generated by the exothermic reaction.

4. The incendiary capsule according to claim 1 wherein the PHS is a compound comprising, by weight:

40-50% barium nitrate 15-20% potassium nitrate 10-15% sulphur 15-20% aluminium 1-5% gum arabic.

5. The incendiary capsule according to claim 2 wherein the liquid impervious coating comprises a solvent or solvent mixture applied as a liquid on the PHS and subsequently allowed to dry to form the coating.

6. The incendiary capsule according to claim 5 wherein the solvent mixture comprises a mixture of shellac and methylated spirits.

7. A belt of incendiary capsules comprising:

a plurality of capsules according to claim 1; and, respective couplings between adjacent capsules, the couplings joining the capsule bodies in a side by side arrangement to form a belt.

8. The belt according to claim 7 wherein the couplings are formed integrally with the capsule bodies.

9. The belt according to claim 8 wherein the couplings are made of the same material as the capsule bodies.

10. The incendiary capsules according to claim 2 wherein the first part of the ignition system is potassium permanganate.

11. The incendiary capsules according to claim 10 wherein the second part of the ignition system is glycol.

12. An incendiary system comprising at least one incendiary capsule and a dispenser, each of the at least one incendiary capsule being an incendiary capsule according to claim 1; wherein the dispenser is configured to inject a quantity of the second part into the capsule, the second part contacting the first part only when injected into the capsule by the dispenser.

13. The incendiary capsule according to claim 1 wherein the PHS comprises thermite.

14. The incendiary capsules according to claim 1 wherein the first part of the ignition system is potassium permanganate.

15. The incendiary capsules according claim 14 wherein the second part of the ignition system is glycol.

16. The incendiary capsules according to claim 4 wherein the first part of the ignition system is potassium permanganate.

17. The incendiary capsules according claim 16 wherein the second part of the ignition system is glycol.

18. A belt of incendiary capsules comprising:

a plurality of capsules according to claim 4; and, respective couplings between adjacent capsules, the couplings joining the capsule bodies in a side by side arrangement to form a belt.

19. The incendiary capsule according to claim 2 wherein the injector is configured to use a needle to inject the liquid second part into the capsule body.

20. The incendiary capsule according to claim 19 wherein, when injecting the liquid second part into the capsule body, the needle is controlled to penetrate into the capsule to a depth that does not reach the PHS.

* * * * *